(12) United States Patent
Kosaki

(10) Patent No.: US 9,143,322 B2
(45) Date of Patent: Sep. 22, 2015

(54) COMMUNICATION APPARATUS, DATA COMMUNICATION METHOD, AND NETWORK SYSTEM

(75) Inventor: Makoto Kosaki, Kasugai (JP)

(73) Assignee: Cypress Semiconductor Corporation, San Jose, CA (US)

(*) Notice: Subject to any disclaimer, the term of this patent is extended or adjusted under 35 U.S.C. 154(b) by 575 days.

(21) Appl. No.: 12/606,870

(22) Filed: Oct. 27, 2009

(65) Prior Publication Data

US 2010/0161989 A1 Jun. 24, 2010

(30) Foreign Application Priority Data

Dec. 18, 2008 (JP) .................. 2008-322288

(51) Int. Cl.
*H04L 9/32* (2006.01)
*H04L 9/08* (2006.01)
*H04L 29/06* (2006.01)

(52) U.S. Cl.
CPC ............ *H04L 9/0838* (2013.01); *H04L 9/0894* (2013.01); *H04L 9/3271* (2013.01); *H04L 63/061* (2013.01); *H04L 63/08* (2013.01); *H04L 2209/605* (2013.01)

(58) Field of Classification Search
CPC ................................. H04L 9/08; H04L 63/061
USPC .......................................... 713/171; 380/259
See application file for complete search history.

(56) References Cited

U.S. PATENT DOCUMENTS

| | | | |
|---|---|---|---|
| 6,212,633 B1* | 4/2001 | Levy et al. ............ | 713/153 |
| 7,017,041 B2* | 3/2006 | Sandhu et al. .......... | 713/156 |
| 7,287,282 B2 | 10/2007 | Yamada et al. | |
| 2003/0037269 A1* | 2/2003 | Baker et al. ............ | 713/320 |
| 2003/0110378 A1 | 6/2003 | Yamada et al. | |
| 2003/0147534 A1* | 8/2003 | Ablay et al. ............ | 380/270 |
| 2004/0034787 A1 | 2/2004 | Kitani | |

(Continued)

FOREIGN PATENT DOCUMENTS

| | | |
|---|---|---|
| EP | 1047224 A2 | 10/2000 |
| JP | 2000-278258 A | 10/2000 |

(Continued)

OTHER PUBLICATIONS

Shinji Takada, "High Speed Digital Interface", Nikkan Kogyo Shimbun Ltd., Jan. 2000, p. 133-149.

(Continued)

*Primary Examiner* — Anthony Brown

(57) ABSTRACT

A communication apparatus includes a storage part configured to store a first key generated according to authentication with a transmission source, identification information of the transmission source, and first information remaining unchanged regardless of the initialization of a coupling status and corresponding to the transmission source, with the first key, the identification information and the first information mapped to each other, an acquisition part configured to acquire a public key from the transmission source holding the identification information responsive to the first information stored on the storage part if the identification information of the transmission source has changed in response to the initialization of the coupling status, and a calculation part configured to generate an encryption key for use in encryption and decryption of data transmitted by the transmission source, based on the first key responsive to the first information, and the public key.

19 Claims, 14 Drawing Sheets

(56) References Cited

U.S. PATENT DOCUMENTS

| | | |
|---|---|---|
| 2005/0015525 A1* | 1/2005 | Cahill et al. .................... 710/62 |
| 2005/0038994 A1* | 2/2005 | Johnson et al. .............. 713/165 |
| 2005/0060547 A1* | 3/2005 | Saito et al. .................... 713/171 |
| 2005/0166050 A1 | 7/2005 | Kosaki |
| 2008/0032788 A1* | 2/2008 | Carlson .......................... 463/29 |
| 2008/0162934 A1 | 7/2008 | Okawa |
| 2009/0041424 A1 | 2/2009 | Ayaki et al. |
| 2009/0099967 A1* | 4/2009 | Yokota et al. .................... 705/55 |

FOREIGN PATENT DOCUMENTS

| | | |
|---|---|---|
| JP | 2000-307603 A | 11/2000 |
| JP | 2004-005830 A | 1/2004 |
| JP | 2004-326304 A | 11/2004 |
| JP | 2007104430 A | 4/2007 |
| WO | WO 02/30054 A1 | 4/2002 |
| WO | WO 2004/105308 A1 | 12/2004 |
| WO | WO 2007/046376 A1 | 4/2007 |
| WO | WO 2008/035450 A1 | 3/2008 |

OTHER PUBLICATIONS

Office Action issued on May 14, 2013, in counterpart Japanese Patent Application No. 2008-322288 (7 pages including English translation).

Japanese Notification of Reasons for Refusal issued Oct. 30, 2012, in counterpart Japanese Patent Application No. 2008-322288 (9 pages including English abstract).

Shunichi, Ko, et al., "In-Vehicle Nerve Network: Automotive Network", Fujitsu, Fujitsu Limited, Jul. 10, 2008, vol. 59, No. 4, pp. 449-454 (English Abstract included).

English-Language Abstract for Japanese Patent Publication No. 2000-278258 A, published Oct. 6, 2000; 1 page.

* cited by examiner

FIG. 4

| STORAGE DESTINATION OF EXCHANGE KEY Kx | CHANNEL NUMBER | NODE ID |
|---|---|---|
| ADD1 | CH1 | 0 |
| ADD2 | CH5 | 2 |
| ⋮ | ⋮ | ⋮ |

DB

COMMUNICATION APPARATUS, DATA COMMUNICATION METHOD, AND NETWORK SYSTEM

CROSS-REFERENCE TO RELATED APPLICATIONS

This application is based upon and claims the benefit of priority of the prior Japanese Patent Application No. 2008-322288 filed on Dec. 18, 2008, the contents of which are incorporated herein by reference.

FIELD

The present embodiments discussed herein relate to a communication apparatus, a data communication method, and a network system.

BACKGROUND

A digital interface installed on a digital versatile disc (DVD) player or the like includes an IEEE1394 high performance serial bus performing copyright management, data encryption, and communication.

In an encryption method applied in encryption and communication, authentication is performed first between a transmitter and a receiver. Two types of authentication are formulated, namely, full authentication based on a public key encryption method and restricted authentication based on a secret key method. The restricted authentication handles two types of data (content), namely, no more copy data and copy one generation data. The full authentication handles copy never data in addition to the no more copy data and the copy one generation data. Once authentication of any type has been successfully completed, a transmitter 100 and a receiver 200 share the similar authentication key Kauth. The transmitter 100 produces an exchange key Kx on a per data type basis (such as no more copy, copy one generation, and copy never). The transmitter 100 then encrypts the exchange key Kx with the authentication key Kauth into an encryption exchange key Ksx, and then transmits the encryption exchange key Ksx to the receiver 200. Upon receiving the encryption exchange key Ksx, the receiver 200 decrypts the encryption exchange key Ksx with the shared authentication key Kauth into the original exchange key Kx. The receiver 200 has thus successfully performed the authentication process, and commonly shares the similar exchange key Kx with the transmitter 100.

The transmitter 100 prepares another public key, namely, nonce for content channel (Nc). The transmitter 100 performs a calculation process using two keys, i.e., the exchange key Kx and the public key Nc, thereby producing a content key Kc. The transmitter 100 encrypts data to be transmitted using the content key Kc (encryption key) and then transmits the encrypted data to the receiver 200. The receiver 200 produces the content key Kc using the two keys, i.e., the public key Nc and the shared exchange key Kx, and decrypts the encrypted data from the transmitter 100 using the content key Kc.

Through the encryption method described above, the receiver 200, once successfully authenticated, can check the content of the encrypted data. A receiver which has not undergone the authentication process cannot recognize the value of the content key Kc (the exchange key Kx). Even if the transmitted encrypted data has been successfully acquired, the receiver cannot decrypt the encrypted data. Unauthorized copying is thus prevented.

A similar technique is discussed in the paper entitled "High-speed Interface, Application to IEEE1394 AV Devices" authored by Shinji TAKADA, and published by Nikkan Kogyo Shimbun Ltd., January 2000, pp. 133-149.

In order to transfer data, the authentication process needs to be performed between the transmitter and the receiver using one of the full authentication and the restricted authentication. The full authentication and the restricted authentication undergo a complex calculation process, and take time. In particular, the full authentication includes an extremely complex calculation process that is based on a digital signature algorithm (DSA) and a Deffie-Hellman (DH) key exchange algorithm based on elliptic curve cryptographic technique. A long period of time is needed to perform the authentication process.

If noise is induced on an IEEE1394 bus, a bus reset can be initialized. The authentication process needs to be performed again subsequent to the bus reset. For this reason, the encrypted data cannot be decrypted on the receiver until the authentication process and key exchanging subsequent to the authentication process are completed. Data communication is thus suspended for a long period of time.

SUMMARY

According to an aspect of the disclosure, a communication apparatus includes a storage part configured to store a first key generated according to authentication with a transmission source, identification information of the transmission source, and first information remaining unchanged regardless of the initialization of a coupling status and corresponding to the transmission source, with the first key, the identification information and the first information mapped to each other, an acquisition part configured to acquire a public key from the transmission source holding the identification information responsive to the first information stored on the storage part if the identification information of the transmission source has changed in response to the initialization of the coupling status, and a calculation part configured to generate an encryption key for use in encryption and decryption of data transmitted by the transmission source, based on the first key responsive to the first information, and the public key.

The object and advantages of the described herein will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates a database of the first embodiment in FIG. 1.

DESCRIPTION OF EMBODIMENTS

A first embodiment is described with reference to FIGS. 1-7.

Figure 2:
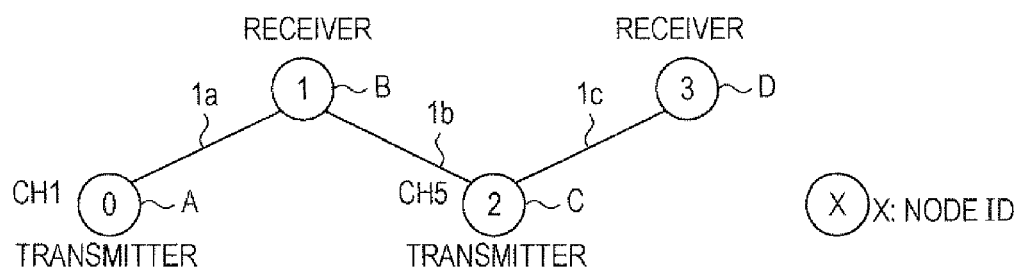
FIG. 2 illustrates a network system of the first embodiment illustrated in FIG. 1.

FIG. 2 illustrates a system configuration (topology) complying with the IEEE1394 standard. A node B is coupled to a node A via an IEEE1394 bus cable 1a. A node C is coupled to the node B via a bus cable 1b, and a node D is coupled to the node C via a bus cable 1c. The nodes A-D are generic designations representing coupling points such as a DVD player, a digital television, a digital set-top box, etc. Here, the nodes A and C refer to transmitters such as the DVD player, the digital set-top box, and the like, and the nodes B and D refer to receivers such as the digital television.

Each of the nodes A-D is equipped with an IEEE1394 protocol controller (IPC) supporting a copy protection function. The internal structure of the node B as the receiver is described in detail. The node D is identical in structure to the node B.

Figure 1:
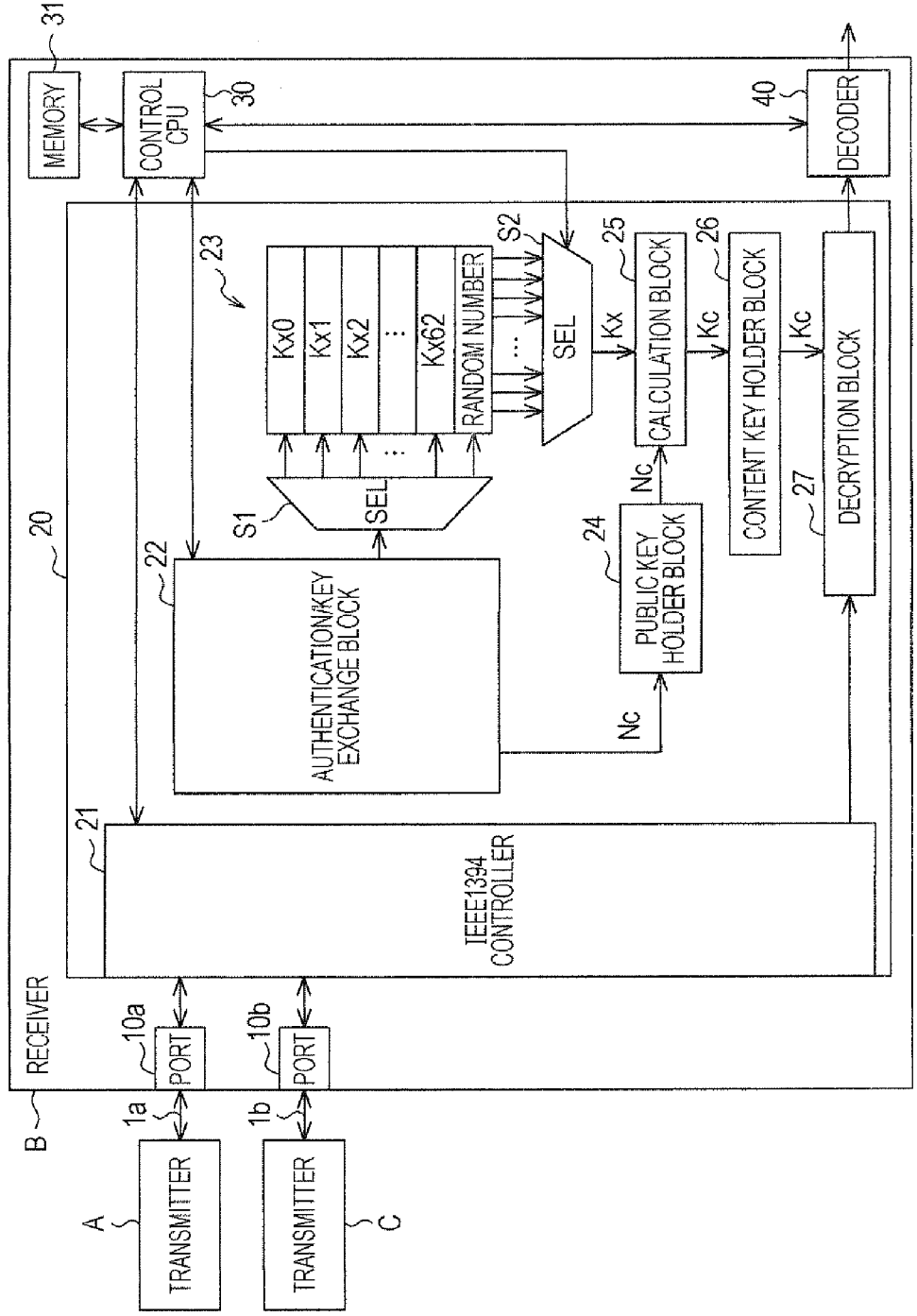
FIG. 1 illustrates a receiver of a first embodiment.

As illustrated in FIG. 1, the node B includes ports 10a and 10b, IPC 20, control CPU 30, memory 31, and decoder 40.

The port 10a is coupled to the node A via the bus cable 1a and the port 10b is coupled to the node C via the bus cable 1b. These ports 10a and 10b convert electrical signals received from the other nodes into electrical signals to be handled in the receiver node B, and then output the resulting electrical signals to an IEEE1394 controller 21 in the IPC 20. The ports 10a and 10b also convert electrical signals from the IEEE1394 controller 21 into electrical signals complying with the IEEE1394 standard and then output the resulting electrical signals to the other nodes.

The IPC 20 includes controller 21, authentication and key exchange block 22, exchange key storage block 23, public key holder block 24, calculation block 25, content key holder block 26, and decryption block 27. The authentication and key exchange block 22, the exchange key storage block 23, the public key holder block 24, the calculation block 25, the content key holder block 26, and the decryption block 27 carry out a copy protection function. The IPC 20 is arranged on a one-chip large-scale integrated circuit (LSI). Optionally, the ports 10a and 10b, the control CPU 30, and the IPC 20 may be arranged on a one-chip LSI.

The controller 21 complies with the IEEE1394 standard, and includes a physical layer and a link layer. In the physical layer, a bus configuration is performed to initialize and reconstruct the topology. The bus configuration includes initialization of information related to a bus of all nodes in the topology, determination of a route nodes, determination of a node ID of each node, and transmission of a self ID packet for notification of the node ID. In the link layer, a data CRC and a header CRC are generated, and transmission and reception of a CRC check and packet are performed.

Upon receiving a packet containing the public key Nc from the transmitter, the controller 21 outputs the packet to the control CPU 30. Upon receiving a packet containing the data encrypted with the content key Kc, the controller 21 outputs the packet to the decryption block 27.

Figure 14:
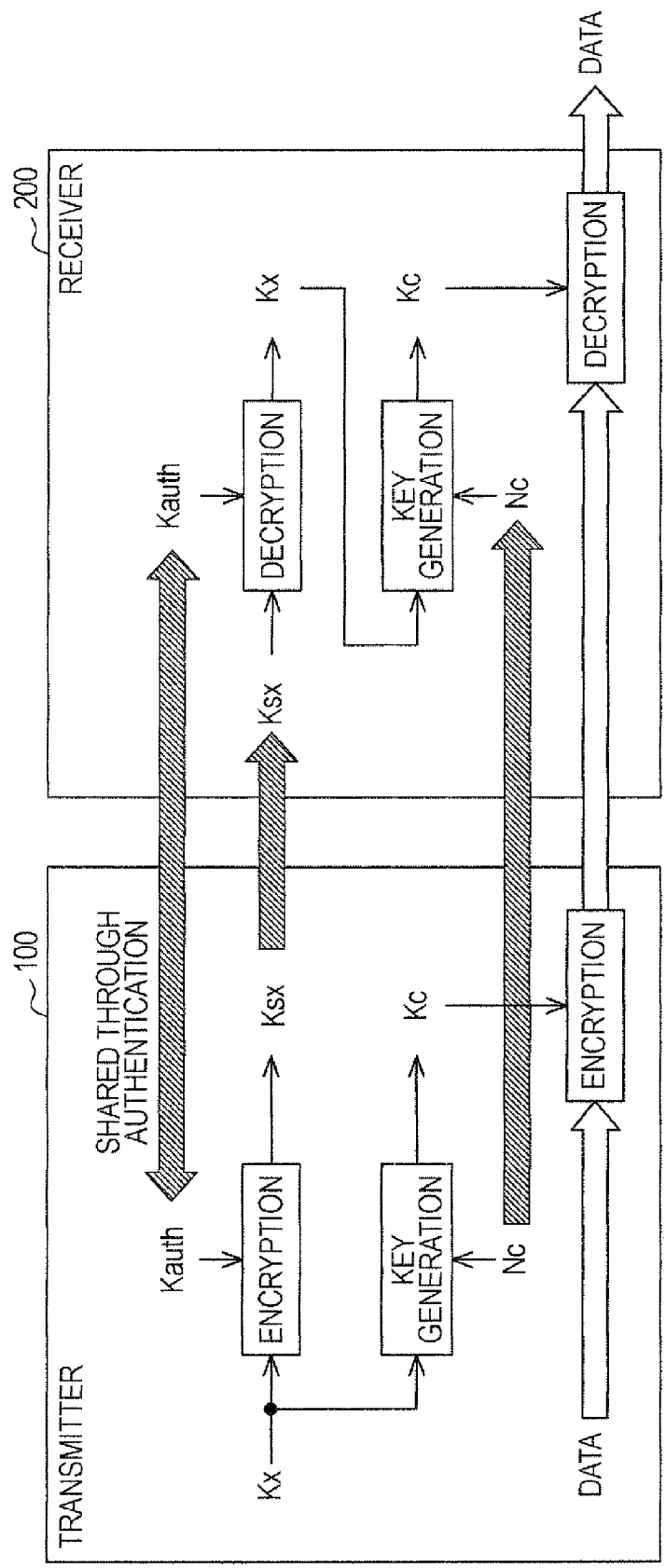
FIG. 14 illustrates an authentication and key exchange process of the embodiments.

The authentication and key exchange block 22 performs an authentication process and a key exchange process to be discussed later with reference to FIG. 14. The authentication and key exchange block 22 stores the exchange keys Kx acquired through the key exchange process and corresponding to all transmitters onto a predetermined area of the exchange key storage block 23, designated by the control CPU 30, via an input selector S1. The authentication and key exchange block 22 then stores the public key Nc input from the control CPU 30 onto the public key holder block 24.

An output selector S2 of the exchange key storage block 23 outputs to the calculation block 25 the exchange key Kx designated by a selection signal output from the control CPU 30 for selecting the exchange key Kx responsive to the target transmitter. The exchange key storage block 23 sets the initial value thereof at a random number. The reason for this is described below.

The initial value of a memory area of the exchange key storage block 23 is an initial value of the LSI. It is highly likely that the initial value of the LSI is all zeros or all ones under manufacturing conditions. If the memory area storing the exchange key Kx is all zeros or all ones, that value can be unscrupulously used as the exchange key Kx. More particularly, even if a receiver having not undergone the authentication has received the encrypted data from a transmitter, the value of the content key Kc is not known. The receiver cannot decrypt the encrypted data. However, even if a receiver has not undergone the authentication, the receiver can still acquire the value of the public key Nc because the public key Nc is public. The value of the exchange key Kx is unknown to the receiver. In other words, if the receiver can estimate the value of the exchange key Kx, the receiver can decrypt the encrypted data without completing the authentication.

If the receiver uses an incorrect exchange key Kx, the encrypted data cannot be correctly decrypted. However, abnormally decrypted data has still some sort of regularity. If all zeroes or all ones are used for the exchange key Kx, the abnormally decrypted data has similar regularity at each decryption cycle. It is highly likely that a correct exchange key Kx is predicted from the regularity. If the value such as all zeroes or all ones is unscrupulously used for the exchange key Kx, an unauthorized receiver not properly authenticated is likely to destroy copy guard.

With the initial value of the exchange key storage block 23 set to a random number, abnormally decrypted data also becomes random at each decryption cycle. The prediction of a correct value of the exchange key Kx is effectively prevented. Security against cracking is thus increased.

The public key holder block 24 outputs the public key Nc to the calculation block 25. The calculation block 25 produces the content key Kc by performing a calculation operation on the input exchange key Kx and public key Nc. The content key Kc is stored on the content key holder block 26. The content key holder block 26 then outputs the content key Kc to the decryption block 27.

The decryption block 27 decrypts the encrypted data, input from the controller 21, with the content key Kc from the content key holder block 26. The decryption block 27 decrypts the encrypted data according to the M6 encryption algorithm. The decryption block 27 then outputs a decrypted packet (such as MPEG packet) to the decoder 40. The decoder 40 acquires image data from the encrypted packet from the decryption block 27. The decoder 40 then outputs the image data to a television monitor, and a moving image is thus displayed on the television monitor.

The control CPU 30 generally controls the IPC 20 and the decoder 40. The control CPU 30 issues a content key request to each transmitter, and outputs a public key Nc, acquired in response to the content key request, to the authentication and key exchange block 22. The control CPU 30 outputs to the authentication and key exchange block 22 a signal designating a storage destination of the exchange key Kx acquired in a key exchange process of the authentication and key exchange block 22. Also the control CPU 30 stores, onto a database DB (see FIG. 4) of the memory 31, the storage destination of the exchange key Kx, a node ID (identification information) of a transmitter as an authentication partner, and an isochronous channel number CH of the transmitter with the storage destination, the node ID, and the isochronous channel number CH mapped to each other. In response to the channel number CH currently being received, the control CPU 30 outputs to the output selector S2 of the exchange key storage block 23 a signal selecting the exchange key Kx responsive to the transmitter of that channel. The embodiment inhibits the control CPU 30 from reading directly the value of the exchange key Kx. If the node ID of the transmitter changes subsequent to bus reset, the control CPU 30 updates the node ID in the database DB to a node ID subsequent to the node IC change. The control CPU 30 of the embodiment thus functions as an acquisition part, a selector, a control part and an updating part.

The operation of the network system (the node B in particular) thus constructed is used to describe the function of each element.

An authentication and key exchange process at power-on of the nodes A-D is described below with reference to FIG. 3.

When power is supplied to each of the nodes A-D illustrated in FIG. 2, the controller 21 of each of the nodes A-D configures a bus. In a bus initialization phase, a bus reset is generated (step S1). Information regarding the topology of each node is deleted. A tree-like topology illustrated in FIG. 2 is generated during a tree identification phase subsequent to the end of the bus reset, and a route and a node serving an isochronous manager are determined (step S2). Node IDs of the nodes A-D are determined during a self identification phase. A self ID packet containing the node ID is broadcast from each of the nodes A-D (step S3). As illustrated in FIG. 2, the nodes A, B, C, and D are assigned the node IDs "0," "1," "2," and "3" in that order. By receiving the self ID packet, the number of nodes in the topology and the node ID of each node are acquired. The number of nodes in the topology is stored on the memory 31 (step S4).

When the bus configuration is completed, the nodes A-D read information from a configuration ROM and a plug control register (oPCR) of a node excluding the self node (step S5) according to the AV/C protocol defined in the IEC61883 standard. The configuration ROM stores information unique to each node, such as a company ID for manufacturer identification, a chip ID for chip identification, a vendor ID for module manufacturer identification, and a serial number. By reading these pieces of information, the nodes A-D recognize the apparatuses as the nodes currently coupled to the bus. The read information is stored on the memory 31 or the like.

Data transmission modes defined in IEEE1394 include an asynchronous (Async) transfer mode that permits data to be transmitted and received at any timing, and an isochronous (Iso) transfer mode that permits data to be transmitted at regular intervals. The data handled in the Iso transfer mode is sound, video, etc. and needs to be transferred on a real-time basis. IDs of a transmission source and a transmission destination are needed in the Async transfer mode while an isochronous channel number is needed in the Iso transfer mode. In order to transfer data in the Iso transfer mode, each transmitter needs to reserve a channel number and a bandwidth. The channel number and the bandwidth are resources of all the nodes coupled to a bus. An isochronous resource manager manages these resources. The isochronous resource manager manages the resources by disclosing a register that stores usage information of the channel numbers and the remaining amount of bandwidth.

In step S6, the transmitters (the nodes A and C here) reserve channel numbers and output plugs (oPCR) for transmission according to the AV/C protocol. The channel number is reserved by rewriting the register disclosed by the isochronous resource manager. Here, the node A reserves channel number CH1, and the node C reserves channel number CH5. In order to receive the data that has been transmitted using the reserved channel numbers, the receivers (the nodes B and D here) set an input plug (iPCR) related to a reception channel number (step S7).

The receivers (the node B and D) perform the authentication process and the key exchange process with all the transmitters registered on the register of the isochronous resource manager (step S8). For example, the authentication and key exchange block 22 in the node B first performs the authentication process and the key exchange process with the node A. When the key exchange process is successfully completed between the nodes A and B subsequent to a successful authentication process, the node B has acquired the exchange key Kx. In order to store the acquired exchange key Kx onto a predetermined area of the exchange key storage block 23, the control CPU 30 in the node B outputs to the authentication and key exchange block 22 a signal designating the storage destination of the exchange key Kx. In response to the designation of the storage destination from the control CPU 30, the authentication and key exchange block 22 stores the acquired exchange key Kx on the designated area of the exchange key storage block 23 (step S9). Furthermore, as illustrated in FIG. 4, the control CPU 30 stores on the database DB of the memory 31 the storage destination ADD1 of the exchange key Kx (such as an address or an identification number), the channel number of the node A, and the node ID "0" of the node A with the storage destination ADD1, the channel number of the node A, and the node ID "0" mapped to each other (step S10). If the nodes A and B are fully authenticated to each other, the exchange key Kx supporting a maximum of three types of data (no more copy, copy one generation, and copy never) is acquired. If one of the nodes A and B is not fully authenticated, the exchange key Kx supporting a maximum of two types of data (no more copy and copy one generation) is acquired. For simplicity of explanation, it is assumed that each transmitter acquires the exchange key Kx supporting one type of data.

The node B performs the authentication process and the key exchange process with the node C as another transmitter (step S8), and then stores the acquired exchange key Kx onto the exchange key storage block 23 (step S9). The control CPU 30 in the node B stores, on the database DB of the memory 31, the storage destination ADD2 of the exchange key Kx, the channel number CH5 of the node C, and the node ID "2" of the node C with the storage destination ADD2, the channel number CH5, and the node ID "2" mapped to each other. Similarly, the node D performs the authentication process and the key exchange process with all the transmitters (the nodes A and C), acquires the exchange key Kx, and stores the acquired exchange key Kx onto the exchange key storage block 23. The node D then stores onto the database DB the storage destination of the exchange key Kx, the channel number CH, and the node ID in a mutually mapped state.

As described above, each of the receivers performs the authentication process and the key exchange process with each of the transmitters when the nodes A-D are powered on, and the exchange keys Kx of all the transmitters are pre-stored. This arrangement eliminates the need for performing the authentication process and the key exchange process each time communication partners are switched. Communication switching is thus quickly performed.

Figure 5:
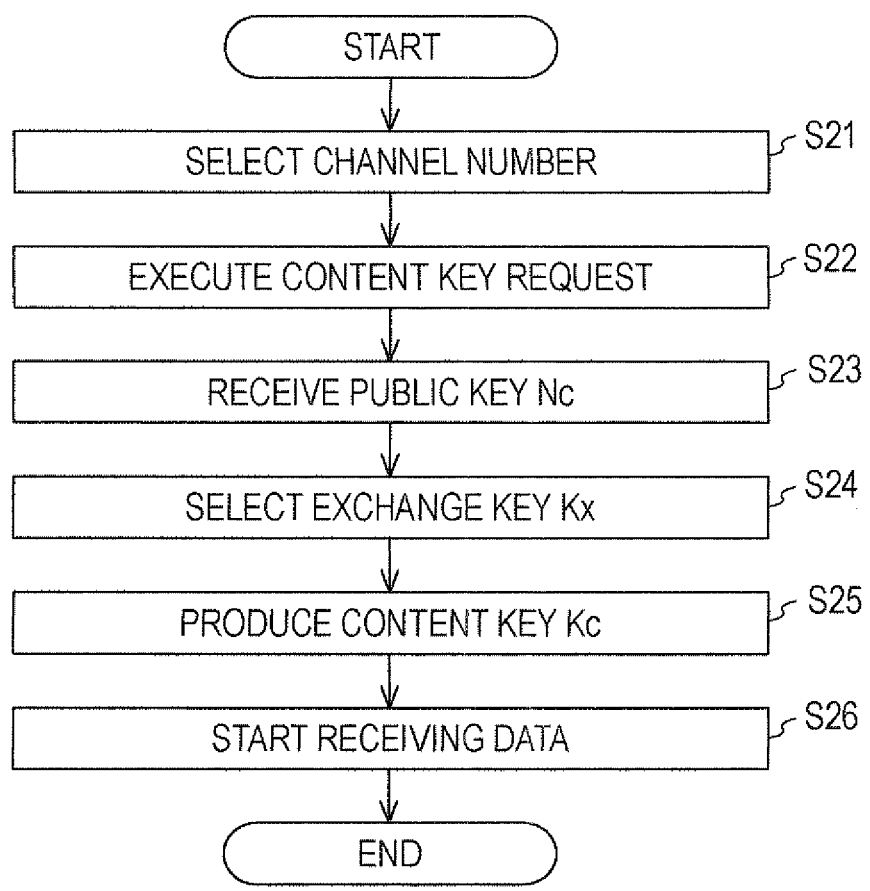
FIG. 5 illustrates a reception process of data according to the first embodiment illustrated in FIG. 1.

The operation of the node B for data reception is described below with reference to FIG. 5.

The node B may wish to receive the data transmitted from the node A. The node B then selects the channel number CH1 of the node A automatically or manually (step S21). The control CPU 30 in the node B sends a content key request to the node A (step S22). Since the content key request is sent in the Async transfer mode, the node IDs of a transfer source and a transfer destination are needed. Since the channel number CH and the node ID are stored in a mutually mapped state on the memory 31 in step S10, the content key request is performed with the node ID "2" corresponding to the selected channel number CH1 being the node ID of the transfer destination. The content key request is thus correctly performed on the node A.

The node B receives the public key Nc used by the node A as a transmission target in response to the content key request (step S23). The control CPU 30 in the node B stores (sets) the received public key Nc onto the public key holder block 24 via the authentication and key exchange block 22. According to the standard, the public key holder block 24 stores together with the received public key Nc a public key resulting from updating the public key Nc once.

Based on the database DB of the memory 31, the control CPU 30 in the node B outputs to the output selector S2 of the exchange key storage block 23 a signal designating the storage destination ADD1 of the exchange key Kx corresponding to the selected channel number CH1. In this way, a desired exchange key Kx stored at the designated area ADD1 of the exchange key storage block 23 is selected and output to the calculation block 25 (step S24). The calculation block 25 calculates the content key Kc in response to the public key Nc from the public key holder block 24 and the exchange key Kx from the exchange key storage block 23, and then stores (sets) the content key Kc onto the content key holder block 26 (step S25). The content key Kc identical to the content key Kc to be used by the node A as a communication target in encryption is thus set on the node B. The node B then starts receiving data (the encrypted data) transmitted from the node A (step S26). For example, the decryption block 27 in the node B decrypts the encrypted data received via the controller 21 with the content key Kc from the content key holder block 26, and then outputs the decrypted data to the decoder 40.

Since the public key Nc is updated (for example, incremented) every predetermined period of time (30 seconds to 2 minutes), the control CPU 30 detects the updating and sets the updated public key Nc on the public key holder block 24.

Figure 6:
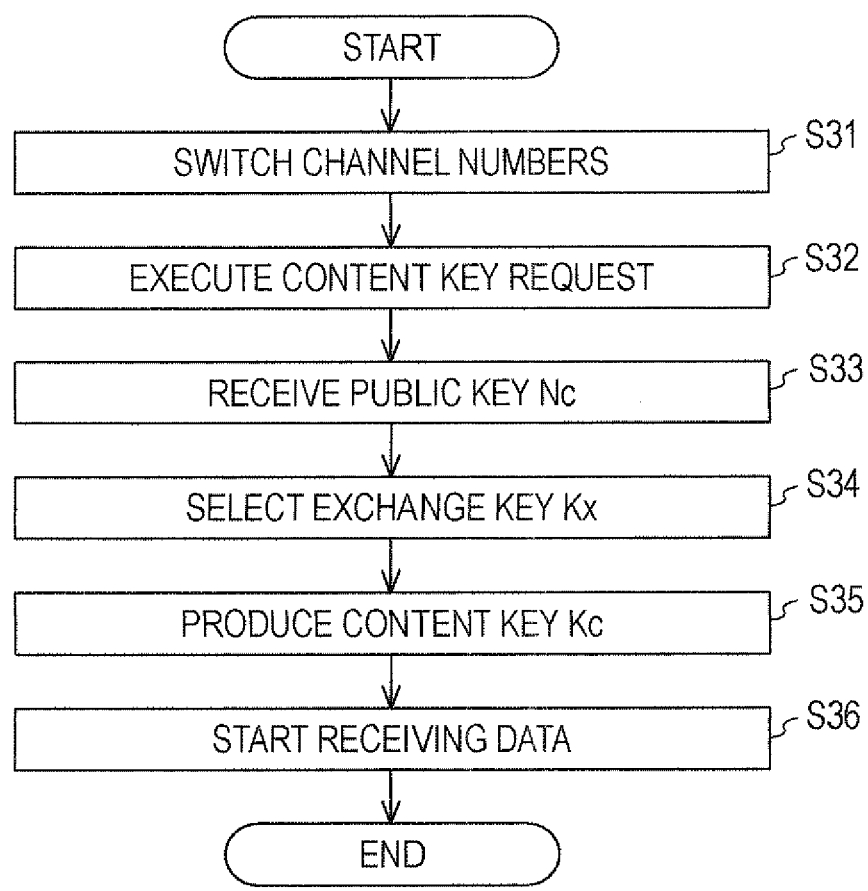
FIG. 6 illustrates a channel number switching process according to the first embodiment illustrated in FIG. 1.

A process of the node B for switching communication targets (transmitters) is described with reference to FIG. 6.

When the node B receives the data from the node A, the node B switches the channel number from CH1 to CH5 automatically or manually (step S31). In other words, the node B starts receiving data from the node C. In steps S32-S36, the process steps identical to those performed in steps S22-S26 are performed. Reception of the encrypted data transmitted from the node C thus starts. Based on the database DB of the memory 31, the control CPU 30 performs the content key request with the node ID "2" corresponding to the channel number CH5 being a transfer destination (step S32). The control CPU 30 then receives the public key Nc from the node C (step S33). The control CPU 30 then designates the storage destination ADD2 of the content key Kc corresponding to the channel number CH5, and selects the exchange key Kx stored at the designated ADD2 (step S34). In this way, the content key Kc identical to the content key Kc to be used in decryption by the node C as a communication target is set in the node B. When the communication targets are switched in this way, the exchange key Kx acquired beforehand in steps S8 and S9 is selected and used. A desired exchange key Kx is set without performing the authentication process and the key exchange process. Communication switching time is thus substantially reduced.

When the bus reset is performed in response to a change in the topology or the generation of a noise, the node B performs the authentication process and the key exchange process. The authentication process and the key exchange process of the node B are described with reference to FIG. 7.

Figure 3:
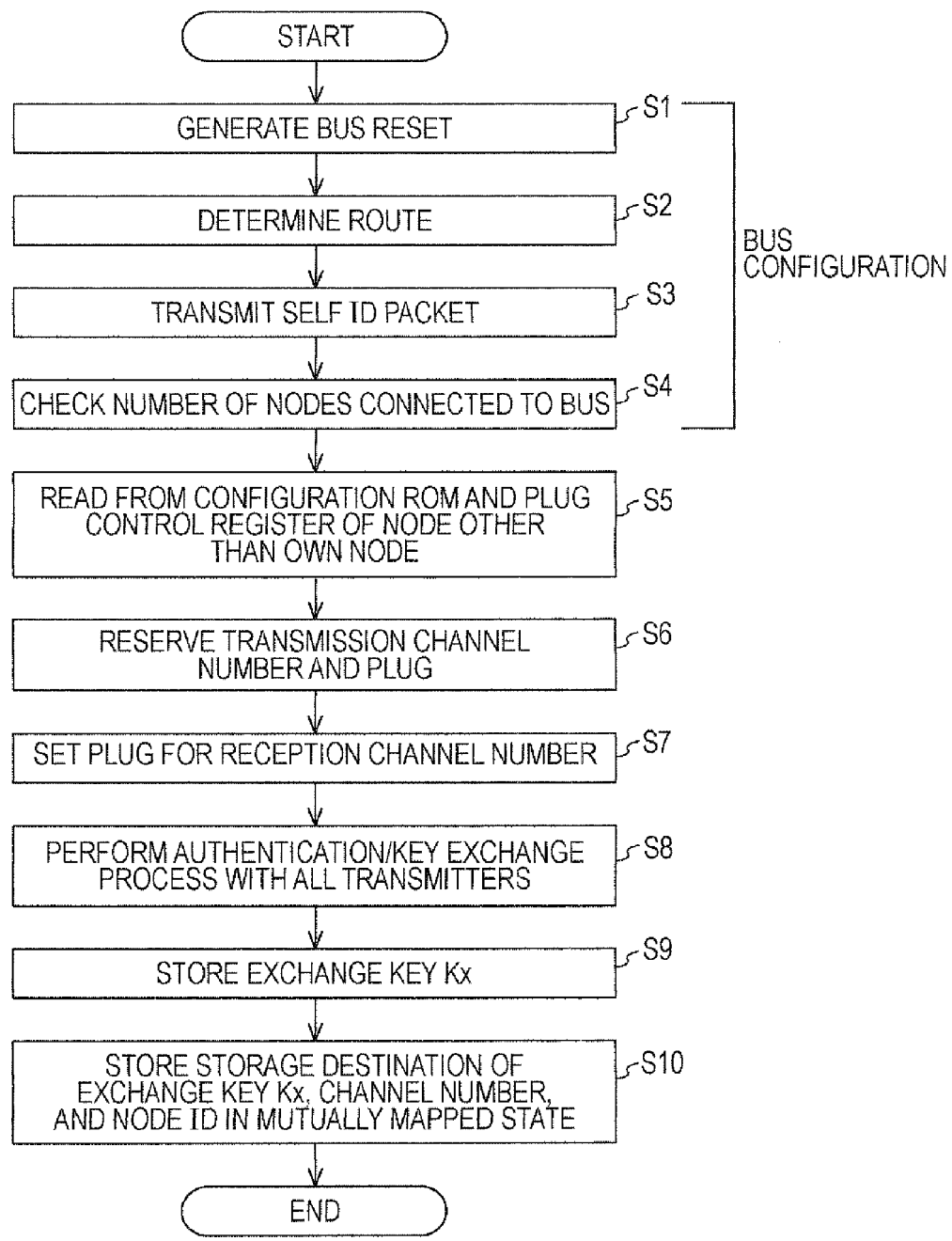
FIG. 3 illustrates an authentication and key exchange process of the embodiments.

If the bus reset takes place in the nodes A-D (see FIG. 2) in the middle of the data transfer between the nodes B and C (step S41), the process steps identical to those in steps S2-S5 illustrated in FIG. 3 are executed in steps S42-S45.

The bus reset is caused by a noise induced on the bus. Even if no change takes place in the topology, the node ID of each node can change from the node ID prior to the bus reset. The standard states that the channel number reserved prior to the bus reset are continuously used if the bus configuration is completed within a predetermined time (1 second for example) from the bus reset. If the bus reset is caused by a noise induced on the bus cable, the bus configuration is completed within about 0.6 to 0.7 second from the bus reset. The channel number remains unchanged at the bus reset even if the bus reset is caused by the noise. The node ID stored on the database DB of the memory 31 may be updated based on the fact that the channel number remains unchanged at the bus reset. The authentication process is thus skipped even if the bus reset takes place in response to the noise.

For example, in step S46, the control CPU 30 in each of the receivers (the nodes B and D) determines, based on the information acquired in steps S43-S45 (the self ID packet, the configuration ROM, etc.), whether the number of nodes coupled to the bus and the coupling status remain unchanged from those prior to the bus reset. If the number of nodes coupled to the bus and the coupling status are different from those prior to the bus reset (NO in step S46), the topology may be different from that prior to the bus reset, and the channel numbers of the nodes A and C may be different from those prior to the bus reset. The change of the channel number means that the node ID has also changed. The transmitter (the channel number or the node ID) that the exchange key Kx acquired in the authentication process and the key exchange process in steps S8 and S9 is unknown. In such a case, process steps in steps S6-S10 in FIG. 3 are executed again, and a database containing the newly acquired exchange key Kx mapped to the channel number CH and the node ID is produced.

If it is determined in step S46 that the number of nodes coupled to the bus and the coupling status remain unchanged from those prior to the bus reset (YES in step S46), the control CPU (determining part) 30 determines that no change has taken place in the topology at the bus reset. In other words, the control CPU 30 determines the bus reset in step S41 has been caused by a noise, and then determines that no change has taken place in the channel numbers of the nodes A and C. Processing proceeds to step S47. In step S47, the control CPU 30 determines whether the node IDs of the nodes A and C have changed from those prior to the bus reset. For example, the control CPU 30 determines whether the node IDs have changed or not by comparing the current mapping of the channel number CH and the node ID on the database DB of the memory 31 with the mapping of the channel number CH and the node ID of the nodes A and C. For example, the channel number CH remains unchanged at the bus reset, and the control CPU 30 determines whether the node ID mapped to the channel number CH has changed in response to the bus reset.

Upon detecting a change in the node ID of the transmitter at the bus reset (NO in step S47), the control CPU 30 updates the node ID within the database DB of the memory 31 to the current node ID (step S48). The content key request and the AV/C command can be sent to the transmitter (node C) as a desired communication target by using the updated node ID as the node ID of the transfer destination. The node B can thus receive correctly the public key Nc to be used by the node C as the transmission target. The control CPU 30 in the node B designates the storage destination ADD2 of the exchange key Kx corresponding to the channel number CH5 currently being received (from before the bus reset), and selects the exchange key Kx stored at the designated area (see step S24 in FIG. 5). In this way, a similar content key Kc as the one for the node C communication target is set in the node B (see step S25 in FIG. 5).

Upon updating the node ID (the database DB), the node B resumes reception of the data (the encrypted data) transmitted by the node C (step S49). If it is determined in step S47 that no change took place in the node ID of each transmitter at the bus reset, the node B resumes reception of the data without performing step S48.

Even if the bus reset takes place by the noise, the data reception is resumed without performing the authentication process and the key exchange process. Suspension time of the data reception in the case of the noise triggered bus reset is substantially reduced.

The above-described embodiment has the advantages described below.

(1) The storage destination of the exchange key Kx, the channel number CH, and the node ID are stored in a mapped state onto the database DB. Regardless of a bus reset triggered by a noise, the channel number CH remains unchanged at the bus reset. Even if the bus reset is triggered by the noise during data reception, a change in the node ID in response to the bus reset is known with respect to the channel number as long as the reading of the configuration ROM (step S45) is completed. For example, how the node ID has changed in response to the bus reset is known with respect to the channel number as long as no change in the topology is confirmed by recognizing the number of nodes coupled to the bus and the coupling status.

The node ID within the database DB is updated based on change information of the node ID, and the content key request is made using the updated node ID. The public key Nc is correctly acquired from the transmitter of the channel number currently being received. The exchange key Kx corresponding to the channel number CH currently being received is selected and used. A similar content key Kc as the content key Kc of the transmitter used as the communication target is set in the receiver. With this arrangement, the receiver resumes the data reception without performing again the authentication process and the key exchange process even if the bus reset is triggered by a noise during data reception. Suspension time of the data reception in the case of the noise triggered bus reset is substantially reduced.

(2) Each of the receivers performs the authentication process and the key exchange process with each of the transmitters at the power on of the nodes A-D in order to pre-store the exchange keys Kx of all the transmitters. This arrangement eliminates the need to perform the authentication process and the key exchange process each time the communication partners are switched. Communication switching is quickly performed.

(3) The initial value of the exchange key storage block 23 is a random number. Even if the exchange key Kx is unscrupulously used as the initial value, prediction of the correct value of the exchange key Kx is effectively controlled. Security against cracking is thus increased.

(4) The control CPU 30 is prevented from reading directly the exchange key Kx stored on the exchange key storage block 23. Security against cracking is increased.

Figure 8:
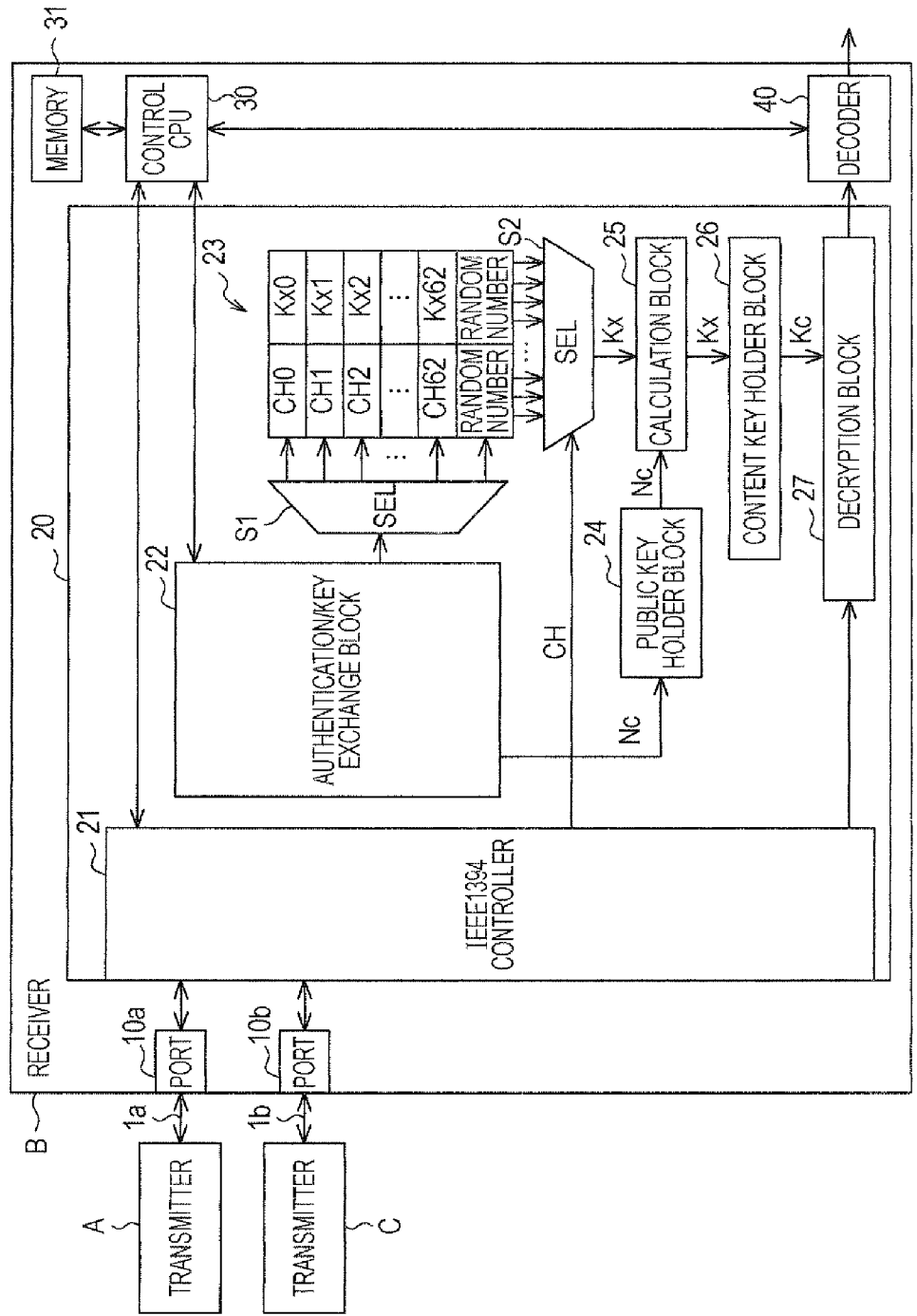
FIG. 8 illustrates a receiver of a second embodiment.

According to the above-described embodiment, the control CPU 30 selects the exchange key Kx according to the channel number CH. The described embodiment is merely an exemplary arrangement, and other arrangements may apply. For example, in response to the channel number CH being received, the exchange key Kx may be automatically selected from the exchange keys Kx stored on the exchange key storage block 23. For example, referring to FIG. 8, the exchange key storage block 23 stores the exchange key Kx and the channel number CH mapped to the exchange key Kx. The channel number CH being received may be input as the selection signal to the output selector S2, and the output selector S2 may select the exchange key Kx corresponding to the channel number CH being received. With this arrangement, a mere selection of the channel number CH being received at the receiver (node B) causes the output selector S2 to select automatically the exchange key Kx corresponding to the channel number CH. The switching of the channel number CH being received is automatically followed by the selection of the exchange key Kx.

The content key holder block 26 of the above-described embodiment may be omitted. In such a case, the content key Kc calculated by the calculation block 25 is output to the decryption block 27.

According to the above-described embodiment, the initial value at the exchange key storage block 23 is a random number. Alternatively, the initial value of the exchange key storage block 23 may be all zeroes or all ones.

According to the above-described embodiment, no particular limitation is imposed to the storage area of the exchange key storage block 23. In other words, the storage area of the exchange key storage block 23 may be determined in view of the specifications of the system. For example, according to the IEEE1394 standard, a maximum value of channel number permitted to flow through the bus is 64. According to the above-described embodiment, 64 exchange keys Kx can be stored. Considering a system that allows one transmitter to flow one type of data, the exchange keys Kx for 64 transmitters are stored on the exchange key storage block 23. In contrast, if a smaller number of transmitters connectable to the bus is indicated, the storage area of the exchange key storage block 23 may be reduced.

According to the above-described embodiment, the receivers (the nodes B and D) store the exchange keys Kx of all the transmitters (the nodes A and C) acquired through the key exchange process. The keys stored on the receivers are not limited to the exchange key Kx and may be any key as long as the key is used (as a first key) to generate the content key Kc (encryption key). For example, the authentication key Kauth and the encryption exchange key Ksx may be stored instead of the exchange key Kx. In such a case, the control CPU 30 stores on the database DB the storage destination of at least one of the authentication key Kauth and the encryption exchange key Ksx, the channel number CH, and the node ID with the storage destination, the channel number CH, and the node ID mapped to each other. Alternatively, the authentication key Kauth may be stored together with the exchange key Kx.

The exchange key Kx, the channel number CH, and the node ID (identification information) may be stored in a mutually mapped state on the database DB. Alternatively, a node unique ID in place of the channel number CH may be stored together with the exchange key Kx and the node ID in a mutually mapped state on the database DB. A value stored in a mapped state with the exchange key Kx and the node ID is not limited to any particular value as long as the value is information (first information) remains unchanged regardless of the bus initialization and corresponds to the transmission source (the nodes A and C here). In other words, the value stored in a mapped state with the exchange key Kx and the node ID is not limited to any particular one as long as the value remains unchanged regardless of the bus reset and can uniquely identify the transmitter.

According to the above-described embodiment, one exchange key Kx, one channel number CH, and one node ID are stored in a mutually mapped state on the database DB. Depending on the function of the transmitter, data may be transmitted via two channel numbers CH. In such a case, the similar exchange key Kx may be shared on the two channels CH in the data transmission. The control CPU 30 may store on the database DB the two channel numbers CH and the one node ID with the one exchange key Kx mapped thereto.

According to the above-described embodiment, the control CPU 30 performs the content key request to the transmitter. Alternatively, the IPC 20 (such as the authentication and key exchange block 22) may perform the content key request. The control CPU 30 containing the IPC 20 may be integrated into a single chip LSI.

According to the above-described embodiment, the isochronous resource manager manages the resources according to the AV/C protocol. The invention is not limited to this arrangement. For example, if a cycle master is present over the bus, and the channel numbers CH of the transmitters (the nodes A and C) are fixed, strict resource management may not be necessary. For example, if the channel numbers CH of the transmitters are fixed, steps S6 and S7 illustrated in FIG. 3 may be skipped. Even if the bus reset takes place in such a case, the channel number CH of the transmitter remains unchanged regardless of a change in the topology.

The addition of a node may cause the topology to change at the bus reset. As for the nodes previously present within the topology, how the node ID has been changed is known with reference to the channel number CH remaining unchanged regardless of the bus reset. By updating the node ID within the database DB, the nodes that underwent the authentication process and the key exchange process before the bus reset can resume data reception without the need to perform again the authentication process and the key exchange process subsequent to the bus reset. For example, it is sufficient if the authentication process and the key exchange process is performed with the newly added node subsequent to the bus reset.

If the number of nodes is reduced in response to a physical decoupling of a node at the bus reset, the node ID is updated in the similar manner described above. Node information prior to the bus reset and node information subsequent to the bus reset, stored on the memory 31, shows which node is physically decoupled. The node information regarding the decoupled node is deleted from the database DB. The data reception is resumed without performing again the authentication process and the key exchange process subsequent to the bus reset.

According to the above-described embodiment, each of the receivers performs the authentication process and the key exchange process with each of the transceivers in order to store the exchange keys Kx of all the transmitters at the power-on of the nodes A-D. Alternatively, each receiver may store the exchange key Kx of a predetermined transmitter not at the switch-on but when the authentication process and the key exchange process are performed with the predetermined transmitter subsequent to communication switching. With this arrangement, the data reception is resumed without performing again the authentication process and the key exchange process with the predetermined transmitter when the predetermined transmitter is selected as the communication target. The communication switching time is thus reduced.

Figure 9:
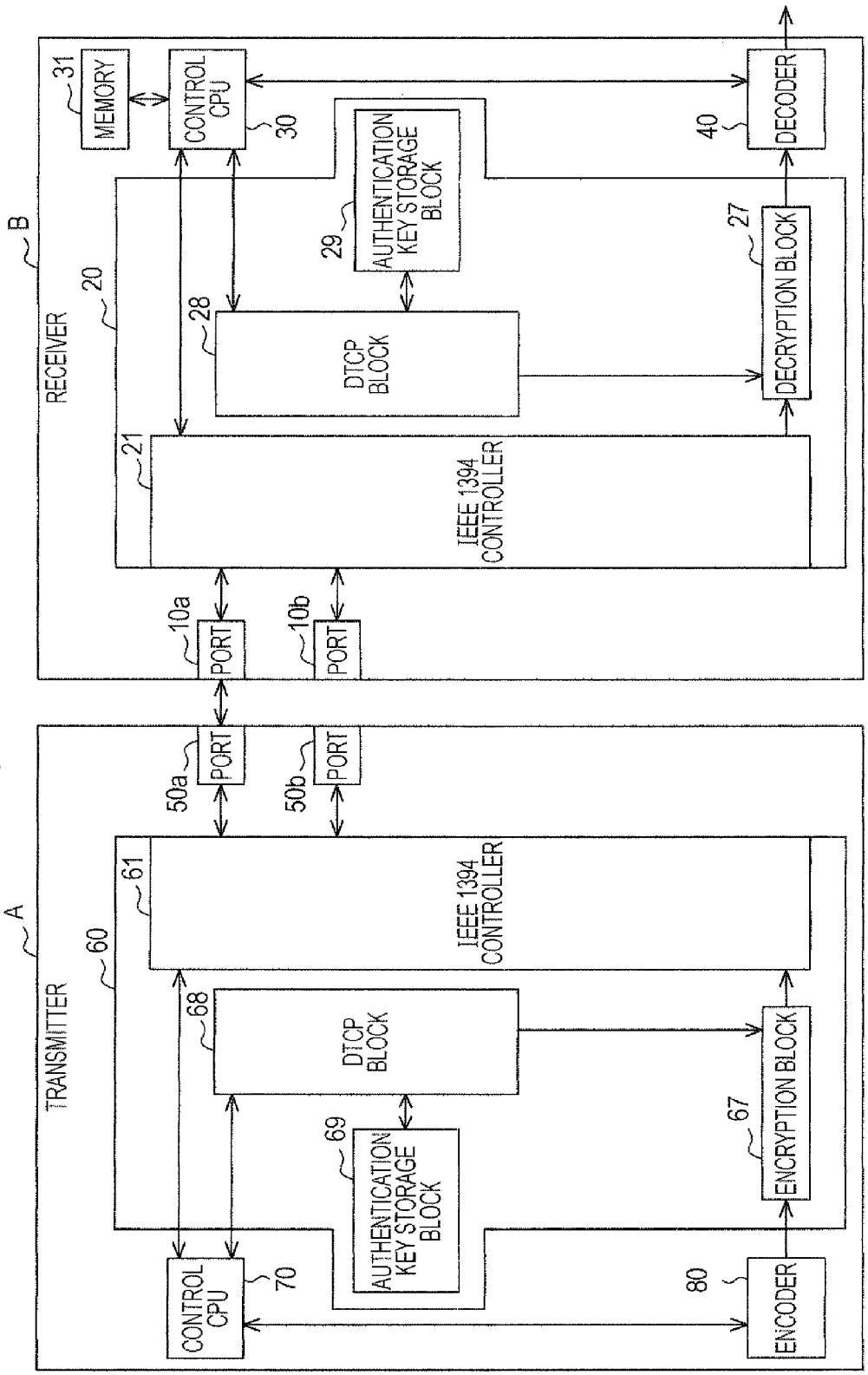
FIG. 9 illustrates a transmitter and a receiver according to the second embodiment illustrated in FIG. 8.

Referring to FIG. 9, the authentication key Kauth that has been shared by the receiver (the node B here) and the transmitter (the node A here) in the authentication process may be held by the receiver and the transmitter. A round trip time (RTT) measurement process is performed without performing the authentication process with the once authenticated device. This point will be described in detail later.

The RTT measurement process is briefly described. For copy protection, a coupling range between a transmitter and a receiver is currently limited in encryption communication. A packet round-trip time (RTT) between the transmitter and the receiver is measured, and the transmitter can transmit data to the receiver if the RTT is equal to or shorter than a time limit. An RTT command is transmitted from the transmitter to the receiver, the receiver transmits a response packet responsive to the RTT command to the transmitter, and the transmitter receives the response packet. The RTT is from the transmission of the RU command by the transmitter to the reception of the response packet by the transmitter. The RU command and the response packet are generated using the authentication key Kauth that is shared by the transmitter and the receiver in the authentication process. For this reason, the RTT measurement process cannot be performed if the authentication key Kauth is not stored at both the transmitter and the receiver. The exchange key Kx may be held at the receiver through the authentication process and the key exchange process, but the authentication process needs to be performed again to acquire the authentication key Kauth if the RTT measurement process is to be performed subsequent to the authentication process and the key exchange process.

With the authentication key Kauth held at both the receiver and the transmitter as illustrated in FIG. 9, the authentication process may be skipped when the RTT measurement process is performed subsequent to the authentication process and the key exchange process. For example, a digital transmission copy protection (DTCP) block 28 in the node B, used as a receiver, has successfully completed the authentication process with the node A, used as a transmitter, and then stores on an authentication key storage block 29 the authentication key Kauth shared with the node A. The DTCP block 28 performs the authentication process, the RTT measurement process, and the key exchange process, and produces the content key Kc. The control CPU 30 stores on the database DB of the memory 31 the storage destination of the authentication key Kauth, the channel number CH of the node A, and the node ID of the node A with a mutually mapped state.

As the node B, the node A as the transmitter includes ports 50a and 50b, an IEEE1394 protocol controller (IPC) 60, a control CPU 70, and an encoder 80. The IPC 60 includes IEEE1394 controller 61, encryption block 67 encrypting data (such as MPEG data) from the encoder 80 such as a DVD player, DTCP block 68, and authentication key storage block 69. The DTCP block 68 stores on the authentication key storage block 69 the authentication key Kauth shared with the node B. The DTCP block 68 performs the authentication process, the RTT measurement process, and the key exchange process, and generates the content key Kc.

Figure 10:
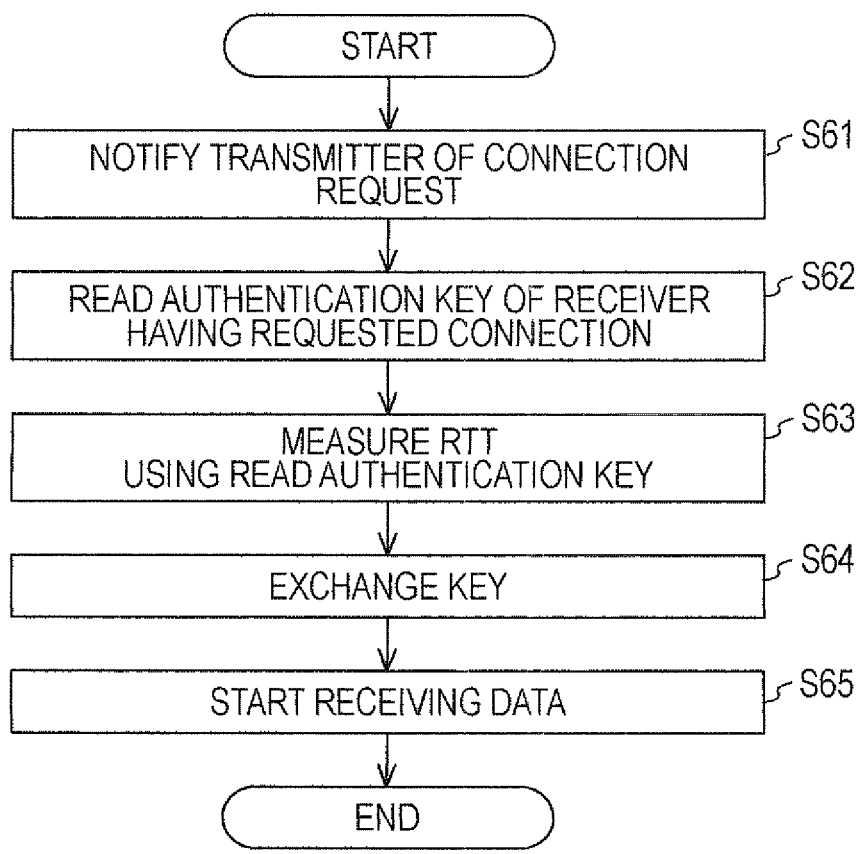
FIG. 10 illustrates an RTT measurement process according to the second embodiment illustrated in FIG. 8.

The RTT measurement process performed between the nodes A and B thus constructed is described with reference to FIG. 10.

The authentication process and the key exchange process and the RTT measurement process are completed between the nodes A and B. The authentication key Kauth shared during the authentication process is held on the authentication key storage blocks 29 and 69 of the nodes A and B. If a request to perform the RU measurement process between the nodes A and B subsequent to the bus reset is issued, the control CPU 30 of the node B as a receiver updates the node ID of the database DB with respect to the channel number (step S50 in FIG. 7). The control CPU 30 (requesting part) notifies the node A as a measurement target of a coupling request in response to the updated node ID (step S61). In response to the coupling request, the control CPU 70 (reading part) in the node A reads from the authentication key storage block 69 the authentication key Kauth responsive to the node B as a transmission source of the coupling request (step S62). Along with the coupling request, the node B reads from the authentication key storage block 29 the authentication key Kauth responsive to the node A.

In step S63, the DTCP blocks 28 and 68 of the nodes A and B perform the RTT measurement process using the read authentication key Kauth. For example, the DTCP block 68 in the node A generates an RTT command using the read authentication key Kauth and then transmits the RTT command to the node B. Upon receiving the RTT command from the node A, the DTCP block 28 in the node B generates a response packet responsive to the RU command using the authentication key Kauth read from the authentication key storage block 29. The DTCP block 28 in the node B transmits the generated response packet to the node A. Upon receiving the response packet, the node A determines whether the time (RU) from the transmission of the RTT command to the reception of the response packet is within the time limit. If the RTT measurement process is within the time limit, processing proceeds to step S64.

In step S64, the key exchange process is performed between the nodes A and B using the authentication key Kauth. The exchange key Kx is thus shared between the nodes A and B, and further the content key Kc is shared between the nodes A and B. In this way, the node B starts receiving the data transmitted from the node A (step S65).

Since the node B (the receiver) holds the exchange key Kx together with the authentication key Kauth through the first authentication and key exchange process, step S64 may be skipped.

To increase security level, the above-described embodiment prevents the control CPU 30 from reading the value of the exchange key Kx (the authentication key Kauth) stored on the exchange key storage block 23 (or the authentication key storage block 29 illustrated in FIG. 9). Alternatively, the control CPU 30 may be permitted to read directly the value of the exchange key Kx (the authentication key Kauth) stored on the exchange key storage block 23 (or the authentication key storage block 29 illustrated in FIG. 9). In such a case, the control CPU 30 may store on the exchange key storage block 23 (the authentication key storage block 29) the exchange key Kx (the authentication key Kauth), the channel number CH, and the node ID in a mutually mapped state. In this case, the database DB may be eliminated from the memory 31 for reducing memory capacity.

A second embodiment is described below.

Even if the bus reset is triggered by a noise, the data reception is resumed without performing again the authentication process. This advantage is particularly enjoyed in an apparatus applied in on-board automobile use. User friendliness is increased in additional function if the IEEE1394 standard is applied for use in on-board automobile application (for example, IDB-1394 standard which may be called 1394 Automotive standard). Such an additional function and the timing of the authentication process and the key exchange process are described with reference to FIGS. 11-13.

Figure 11:
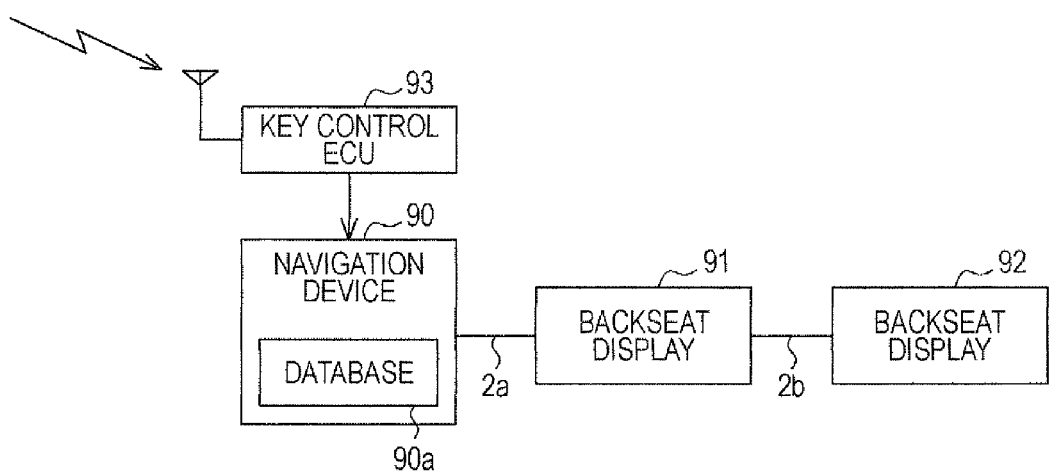
FIG. 11 illustrates a network system according to the second embodiment illustrated in FIG. 8.

FIG. 11 illustrates a system structure complying with the IDB-1394 standard as an on-board automobile version of the IEEE1394 standard. A navigation device 90 is coupled to a backseat display 91 via an IDB-1394 bus cable 2a. The backseat display 91 is coupled to a backseat display 92 via an IDB-1394 bus cable 2b. The navigation device 90 functions as a transmitter and a receiver, and the backseat displays 91 and 92 function as receivers. The navigation device 90 and the backseat displays 91 and 92 are IDB-1394 devices (nodes), and are identical in structure to the nodes B and D of the embodiment. The navigation device 90 is a control node playing a center role in control, and includes a database 90a. Information of devices coupled to the bus is registered (stored) on the database 90a.

The navigation device 90 is coupled to a key control ECU 93. The key control ECU 93, coupled to an antenna, detects a proximity of a key if the key locking or unlocking an automobile having a radio link function gets within a predetermined range. Upon detecting a proximity of the key, the key control ECU 93 outputs to the navigation device 90 an authentication start signal for starting the authentication process.

The navigation device 90, the backseat displays 91 and 92, and the key control ECU 93 are all mounted on board an automobile.

An apparatus registration method at the initial setting of such a network system is described with reference to FIG. 12.

An IDB-1394 device such as the navigation device 90 is installed on an automobile at a plant of the manufacturer or at a dealer (selling office). The number of IDB-1394 devices installed on board the automobile normally remains unchanged after the automobile is transferred to an owner of the automobile. The number of devices may be reduced if any fault takes place. In other words, the number of devices coupled to the bus becomes clear when the manufacture of the automobile is completed or when the automobile is transferred to the owner. The number of coupled devices is stored, and the authentication process is performed based on the number of couplings. This arrangement eliminates the need for each receiver to recognize a maximum number of transmitters each time. By storing the number of couplings and the coupling status, a fault can be detected if the fault takes place in the IDB-1394 device (a malfunction of the IDB-1394 device or a decoupling of the bus cable).

Figure 12:
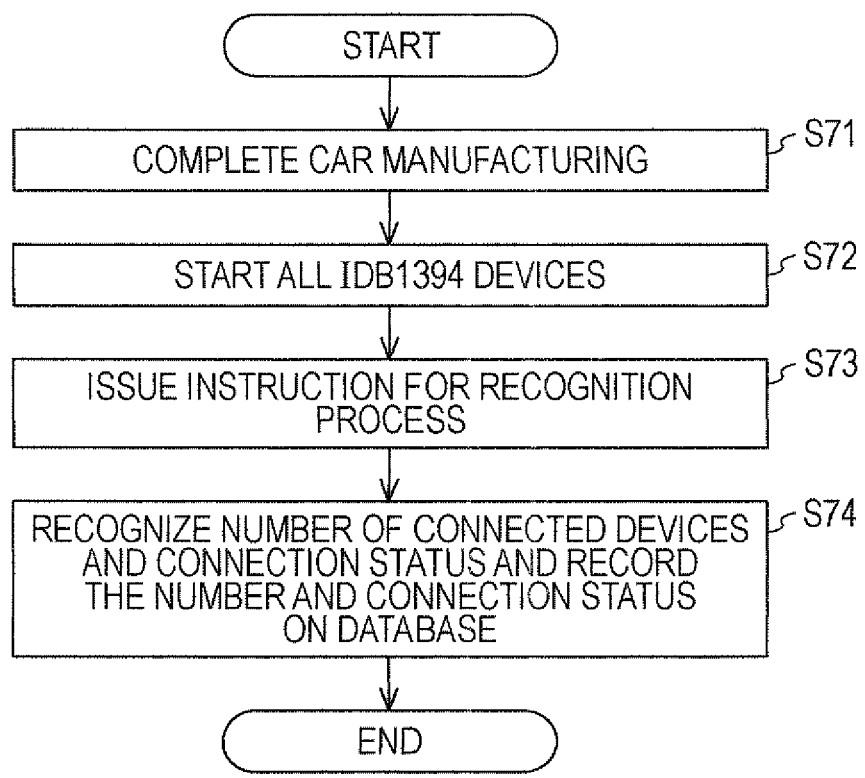
FIG. 12 illustrates an initial setting process according to the second embodiment illustrated in FIG. 8.

As illustrated in FIG. 12, all IDB-1394 devices 90, 91, and 92 start up in response to a switch-on of an accessory, the start of an engine, or the like (step S72) after the completion of the manufacture of an automobile (step S71). A user operates and commands the navigation device 90 as a control node to perform a recognition process (step S73). For example, an icon or a button labeled "recognize coupled device" is provided on a system management display of the navigation device 90. The recognition process is initiated when the user selects such an icon.

When the instruction to start the recognition process is input, the navigation device 90 reads the self ID packets of all other IDB-1394 devices (the backseat displays 91 and 92) coupled to the bus, thereby recognizing the number of coupled devices. Furthermore, the navigation device 90 reads information from the configuration ROMs of all other IDB-1394 devices 91 and 92, thereby recognizing the coupling status of each device. The control CPU 30 in the navigation device 90 stores the recognized number of couplings and the coupling status on the database 90*a* (step S74).

The storage on the database 90*a* may be performed at the timing when the automobile is transported to a dealer or the like, or at the end of the setting at the dealer. The storage on the database 90*a* may be performed when the owner of the automobile starts the engine for the first time, or when the owner installs an IDB-1394 device on board the automobile.

Figure 13:
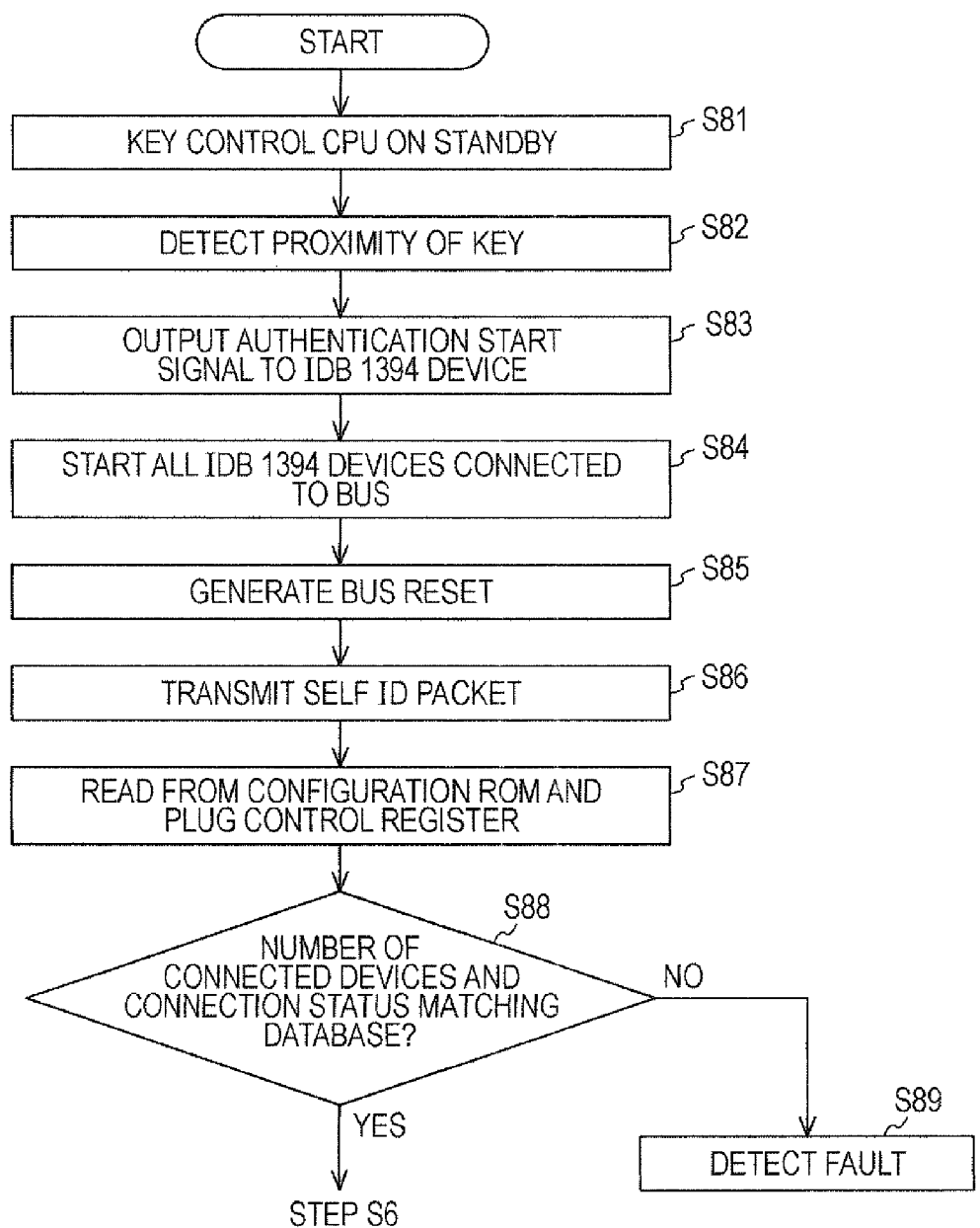
FIG. 13 illustrates a fault detection method according to the second embodiment illustrated in FIG. 8.

A fault detection method of the navigation device 90 is described with reference to FIG. 13.

When the key control ECU 93 is on standby (step S81), the automobile owner approaches the automobile with the key having a radio link function within a predetermined range of the automobile. The key control ECU 93 detects a proximity of the key (step S82). The key control ECU 93 then outputs an authentication start signal to the IDB-1394 device (the navigation device 90 here) in step S83. In response to the authentication start signal, the navigation device 90 is started, followed by the starting of the remaining IDB-1394 devices (the backseat displays 91 and 92) (step S84).

The IEEE1394 controller 21 (see FIG. 1) in each of the navigation device 90 and the backseat displays 91 and 92 generates a bus reset (step S85). In succession, a tree-like topology is formed, and the node IDs are determined. Each of the IDB-1394 devices 90, 91, and 92 broadcasts the self ID packet (step S86). In this way, the number of IDB-1394 devices coupled to the bus is recognized. The navigation device 90 and the backseat displays 91 and 92 reads information from the configuration ROM and plug control register of another device (step S87). The coupling status of the IDB-1394 devices coupled to the bus is thus recognized.

In step S88, the control CPU 30 in the navigation device 90 (see FIG. 1) determines whether the number of couplings and the coupling status acquired in steps S86 and S87 match the number of couplings and the coupling status stored on the database 90*a*. If the number of couplings and the coupling status acquired in steps S86 and S87 fail to match the number of couplings and the coupling status stored on the database 90*a* (NO in step S88), the control CPU 30 in the navigation device 90 (fault detector) detects a fault in an IDB-1394 device coupled to the bus (step S89). For example, if the number of couplings and the coupling status acquired in steps S86 and S87 disagree with those stored on the database 90*a* (for example, the number of couplings is reduced), the control CPU 30 determines that an IDB-1394 device coupled to the bus has failed or that the bus cable has been decoupled. If such a fault is detected, the navigation device 90 may display a message reading "Consult dealer" to alert the user to the fault. By registering the devices on the database 90*a* at the completion of the manufacture of the automobile, a fault of an IDB-1394 device is detected.

If it is determined in step S88 that the number of couplings and the coupling status acquired in steps S86 and S87 agree with those stored on the database 90*a* (YES in step S88), steps S6-S10 illustrated in FIG. 3 are executed. If no fault is detected in the IDB-1394 devices, each of the receivers performs the authentication process and the key exchange process with each of the transmitters when the key automatically locking and unlocking the automobile approaches the automobile, and holds beforehand the exchange key Kx of all the transmitters. Since some time is allowed between the start of the authentication process and the key exchange process and the user's instruction to receive data, data reception is quickly started in response to the reception start instruction. For example, the data reception is started with the user relieved from feeling a slow response to the reception start of data.

Figure 7:
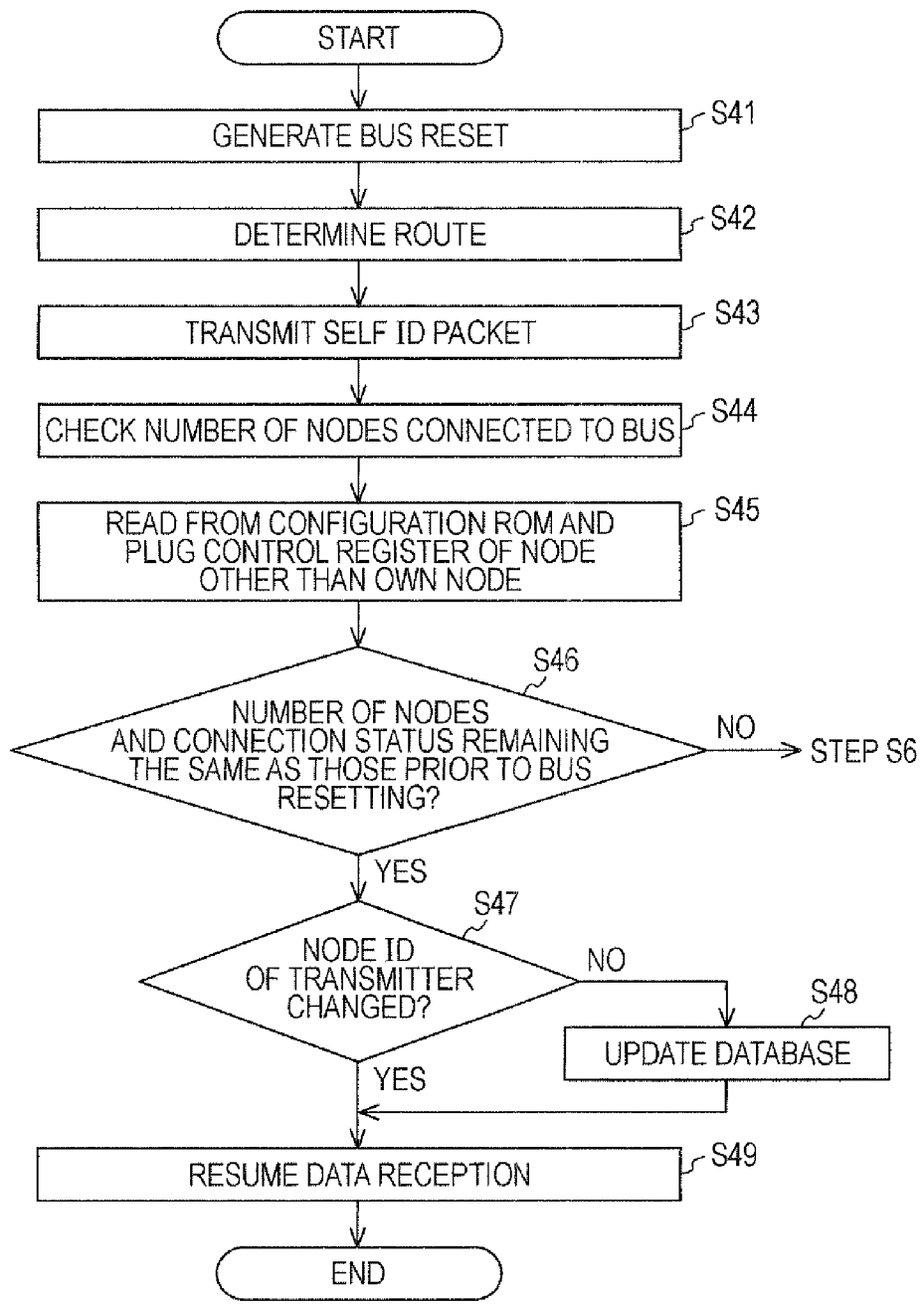
FIG. 7 illustrates a resume process of data reception according to the first embodiment illustrated in FIG. 1.

If the bus reset is triggered by a noise during data communication, similar process steps as those in steps S41-S49 discussed with reference to FIG. 7 are executed.

As described above, the embodiments have the advantages described below.

(1) The number of IDB-1394 devices coupled to the bus and the coupling status are stored on the database 90*a* at the completion of the manufacture of the automobile. The authentication process and the like are performed with reference to the number of couplings and the coupling status. This arrangement eliminates the need for each receiver to recognize the maximum number of transmitters. Each time the IDB-1394 device is started up, the number of couplings and the coupling status then are compared with the content on the database 90*a*. The control CPU 30 can detect whether any IDB-1394 device has failed or not.

(2) When the key automatically locking and unlocking the automobile gets close to the automobile, each of all the receivers performs the authentication process and the key exchange process with each of all the transmitters in order to pre-store the exchange keys Kx of all the transmitters. The data reception is started with the user relieved from feeling a slow response to the reception start of data.

The above-described embodiments may be appropriately modified as described below.

According to the second embodiment, the authentication process and the key exchange process may be executed at the moment the key automatically locking and unlocking the automobile gets close to the automobile. Alternatively, the authentication process and the key exchange process may be performed at a timing that alleviates the user's stress caused by time for the authentication process and the key exchange process. For example, the IDB-1394 devices may be started and the authentication process and the key exchange process may be performed at the switch-on timing of an accessory, the start timing of the engine, the unlocking timing of a door of the automobile, or the timing of physical opening of the door of the automobile.

According to the second embodiment, the key control ECU 93 supports the key having a radio link function. Alternatively, the key control ECU may support a key having no radio link function. In such a case, the IDB-1394 devices may be started and the authentication process and the key exchange process may be performed at the timing the door is unlocked with the key inserted into the key hole of the automobile.

According to the above-described embodiments, the navigation device 90 includes the database 90*a*. Alternatively, each of the backseat displays 91 and 92 may include the database 90*a*.

The above-described embodiments provide the advantage of reducing suspension time during data communication.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment has been described in detail, it should be understood that the various changes, substitutions, and alterations could be made hereto without departing from the spirit and scope of the invention.

What is claimed is:

1. A communication apparatus, comprising:
    a storage part configured to store a first key generated according to authentication with a transmission source on a network;
    a determining part configured to determine whether a topology of the network has changed in response to an initialization of a coupling status;
    an acquisition part configured to acquire a public key, in response to the determining part determining that the topology of the network has changed, from the transmission source corresponding to first information, wherein the first information comprises an isochronous channel number of the transmission source;
    a selecting part configured to select the first key responsive to the isochronous channel number; and
    a calculation part configured to generate an encryption key for encryption or decryption of data transmitted by the transmission source, based on the first key, and the public key.

2. A communication apparatus, comprising:
    a storage part configured to store an isochronous channel number of a transmission source, and a first key mapped to the isochronous channel number;
    a control part configured to store, on a database, a storage destination of the first key;
    a determining part configured to determine whether a topology of the network has changed in response to an initialization of a coupling status;
    an acquisition part configured to acquire a public key, in response to the determining part determining that the topology of the network has changed, from the transmission source corresponding to first information that corresponds to the transmission source, wherein the first information comprises the isochronous channel number; and
    a selecting part configured to select the first key responsive to the isochronous channel number by inputting as a selection signal the isochronous channel number; and
    a calculation part configured to generate an encryption key for use in encryption and decryption of data transmitted by the transmission source, based on the first key, and the public key.

3. The communication apparatus according to claim wherein the storage part is further configured to store identification information of the transmission source.

4. The communication apparatus according to claim 2, wherein the selecting part is configured to select, from the storage part, the first key responsive to the isochronous channel number, in response to a selection signal generated in the control part and designating a storage destination of the first key responsive to the isochronous channel number.

5. The communication apparatus according to claim 3 further comprising an updating part configured to update the identification information stored on one of the storage part and the database according to the first information if the identification information of the transmission source has changed in response to the initialization of the coupling status.

6. The communication apparatus according to claim 5, wherein the updating part is configured to update the identification information if the topology of the network remains unchanged regardless of bus reset.

7. The communication apparatus according to claim 6, wherein the determining part is configured to determine whether the topology of the network has changed by determining whether the number and coupling status of devices coupled to a bus have changed in response to the bus reset.

8. The communication apparatus according to claim 1, wherein the storage part stores the first keys corresponding to a plurality of transmitters coupled to a bus.

9. The communication apparatus according to claim 1, wherein an initial value of a storage area storing the first key comprises a random number.

10. The communication apparatus according to claim 1, wherein the authentication is performed on a plurality of transmitters coupled to a bus at power-on.

11. The communication apparatus according to claim 1, wherein the first key comprises an exchange key.

12. The communication apparatus according to claim 1, wherein the communication apparatus is an TDB-1394 device complying with the IDB-1394 standard, and
    wherein the communication apparatus comprises a device registering database storing the number and coupling status of IDB-1394 devices coupled to a bus.

13. The communication apparatus according to claim 12, further comprising a fault detector configured to detect, at power-on, whether the number and coupling status of IDB-13941 devices coupled to the bus matches the content stored on the device registering database.

14. The communication apparatus according to claim 12, wherein the authentication is performed on all the transmitters coupled to the bus if a key automatically locking and unlocking an automobile having a radio link function gets within a predetermined range of the automobile, if an accessory is switched on, if the engine of the automobile is started, if a door of the automobile is unlocked, or if a door of the automobile is physically opened.

15. A communication method, comprising:
    storing on a storage part a first key generated according to authentication with a transmission source on a network;
    determining whether a topology of the network has changed in response to an initialization of a coupling status;
    in response to determining that the topology of the network has changed, acquiring a public key from the transmission source corresponding to first information, wherein the first information comprises an isochronous channel number of the transmission source;
    selecting the first key responsive to the isochronous channel number; and
    generating an encryption key configured to use in encryption or decryption of data transmitted by the transmission source, based on the first key, and the public key.

16. A network system, comprising:
    a first communication apparatus including a first storage part configured to store an isochronous channel number of a transmission source, and an authentication key shared according to authentication with transmission source on a network; and
    a second communication apparatus including a second storage part configured to store an authentication key shared according to authentication with a transmission destination on the network, wherein the first communication apparatus comprises:

a determining part configured to determine whether a topology of the network has changed in response to an initialization of a coupling status; and a requesting part configured to send, in response to the determining part determining that the topology of the network has changed, a coupling request to the transmission source corresponding to first information, wherein the first information comprises the isochronous channel number of the transmission source.

17. The network system according to claim 16, wherein the second communication apparatus comprises:

a reading part configured to read from the second storage part an authentication key responsive to the source of the coupling request in response to the coupling request from the transmission destination; and an RTT processor configured to generate an RTT command with the read authentication key; and wherein the first communication apparatus comprises an RTT processor configured to generate a response packet with the authentication key responsive to the transmission source stored on the first storage part if the RTT command is received from the transmission source.

18. The communication apparatus according to claim 1, wherein the first information remains unchanged regardless of the initialization of the coupling status.

19. The communication apparatus according to claim 2, wherein the first information remains unchanged regardless of the initialization of the coupling status.

* * * * *